(12) United States Patent
Doumar et al.

(10) Patent No.: US 11,610,193 B2
(45) Date of Patent: Mar. 21, 2023

(54) SYSTEM AND METHOD FOR LINK-INITIATED VERIFICATION AND VALIDATION OF USERS

(71) Applicant: TapText llc, Coral Springs, FL (US)

(72) Inventors: Steve Doumar, Fort Lauderdale, FL (US); Paul Levasseur, Fort Lauderdale, FL (US)

(73) Assignee: TAPTEXT LLC, Coral Springs, FL (US)

( * ) Notice: Subject to any disclaimer, the term of this patent is extended or adjusted under 35 U.S.C. 154(b) by 0 days.

(21) Appl. No.: 17/409,841

(22) Filed: Aug. 24, 2021

(65) Prior Publication Data

US 2021/0374716 A1 Dec. 2, 2021

Related U.S. Application Data

(60) Continuation-in-part of application No. 17/360,731, filed on Jun. 28, 2021, which is a continuation-in-part of application No. 17/229,251, filed on Apr. 13, 2021, which is a continuation-in-part of application No. 17/209,474, filed on Mar. 23, 2021, which is a continuation-in-part of application No. 17/208,059, (Continued)

(51) Int. Cl.
*G06Q 20/32* (2012.01)
*H04W 4/80* (2018.01)
*G06Q 20/40* (2012.01)

(52) U.S. Cl.
CPC ..... *G06Q 20/3276* (2013.01); *G06Q 20/4014* (2013.01); *H04W 4/80* (2018.02)

(58) Field of Classification Search
CPC .. G06Q 20/3276; G06Q 20/4014; H04W 4/80
See application file for complete search history.

(56) References Cited

U.S. PATENT DOCUMENTS

2007/0241189 A1 10/2007 Slavin et al.
2009/0234731 A1 9/2009 Mariotti
(Continued)

OTHER PUBLICATIONS

Akshay Gangwar, "8 Unique Ways to Use NFC Tags with Your Android Phone", Retrieved From https://beebom.com/unique-ways-use-nfc-tags-android-phone/, Published Dec. 14, 2016 (Year: 2016).*

*Primary Examiner* — Chau Le
(74) *Attorney, Agent, or Firm* — Galvin Patent Law LLC; Brian R. Galvin; Brian S. Boon

(57) ABSTRACT

A system and method for a dynamic-link verification process between an electronic device and a transaction or event. The first step is engagement by a mobile electronic device with an initiator that is linked with a specific verification event that triggers a text message to auto-populate on a mobile electronic device. The message comprising metadata about the user and the event or transaction. The second step is for the electronic device to send the auto-populated message to a message gateway thus initiating the verification of the user. The message gateway works with a management service and one or more databases to verify the identify and other aspects of the user based on instructions provided by the event host. Approval or denial of the transaction or request to gain entry is sent to the mobile device and the event host.

12 Claims, 17 Drawing Sheets

Related U.S. Application Data filed on Mar. 22, 2021, which is a continuation-in-part of application No. 17/191,977, filed on Mar. 4, 2021, which is a continuation-in-part of application No. 17/190,260, filed on Mar. 2, 2021, and a continuation-in-part of application No. 17/153,426, filed on Jan. 20, 2021, now abandoned, said application No. 17/360,731 is a continuation-in-part of application No. 17/085,931, filed on Oct. 30, 2020, now Pat. No. 11,055,736, which is a division of application No. 16/693,275, filed on Nov. 23, 2019, now Pat. No. 11,270,354.

(60) Provisional application No. 63/211,496, filed on Jun. 16, 2021, provisional application No. 63/166,391, filed on Mar. 26, 2021, provisional application No. 63/154,357, filed on Feb. 26, 2021, provisional application No. 63/040,610, filed on Jun. 18, 2020, provisional application No. 63/025,287, filed on May 15, 2020, provisional application No. 63/022,190, filed on May 8, 2020, provisional application No. 62/994,219, filed on Mar. 24, 2020, provisional application No. 62/965,626, filed on Jan. 24, 2020, provisional application No. 62/963,568, filed on Jan. 21, 2020, provisional application No. 62/963,379, filed on Jan. 20, 2020, provisional application No. 62/963,368, filed on Jan. 20, 2020, provisional application No. 62/940,607, filed on Nov. 26, 2019, provisional application No. 62/904,568, filed on Sep. 23, 2019, provisional application No. 62/883,360, filed on Aug. 6, 2019, provisional application No. 62/879,862, filed on Jul. 29, 2019.

(56) References Cited

U.S. PATENT DOCUMENTS

| | | | |
|---|---|---|---|
| 2012/0223131 A1* | 9/2012 | Lim | G06Q 30/02 235/375 |
| 2013/0325567 A1 | 12/2013 | Bradley et al. | |
| 2014/0257945 A1 | 9/2014 | Sandridge et al. | |
| 2015/0178721 A1* | 6/2015 | Pandiarajan | G06K 19/06037 705/75 |
| 2015/0178784 A1* | 6/2015 | Oliver | G06Q 30/0267 705/14.64 |
| 2015/0261948 A1 | 9/2015 | Marra et al. | |
| 2015/0278805 A1* | 10/2015 | Spencer, III | G06Q 20/3278 705/44 |
| 2016/0132880 A1 | 5/2016 | O'Regan et al. | |
| 2020/0092272 A1* | 3/2020 | Eisen | G06K 7/1417 |

* cited by examiner

SYSTEM AND METHOD FOR LINK-INITIATED VERIFICATION AND VALIDATION OF USERS

CROSS-REFERENCE TO RELATED APPLICATIONS

Priority is claimed in the application data sheet to the following patents or patent applications, the entire written description, including figures, of each of which is expressly incorporated herein by reference in its entirety:
Ser. No. 17/360,731
Ser. No. 17/229,251
63/166,391
Ser. No. 17/209,474
Ser. No. 17/208,059
Ser. No. 17/191,977
Ser. No. 17/190,260
Ser. No. 17/153,426
62/965,626
62/963,368
62/963,379
63/040,610
63/025,287
63/022,190
62/994,219
63/154,357
Ser. No. 17/085,931
63/040,610
63/025,287
63/022,190
62/994,219
62/965,626
62/963,568
62/963,368
62/963,379
62/940,607
Ser. No. 16/963,275
62/904,568
62/883,360
62/879,862
63/211,496

BACKGROUND

Field of the Art

The disclosure relates to the field of computer-based communication systems, and more particularly to the field of ecommerce and security.

Discussion of the State of the Art

In today's digital world, having your identity verified for an ecommerce transaction is too difficult and includes too many steps and too many parties with respect to the consumer. Along the same lines and in light of the recent pandemic, it is important to verify the identity and potentially the vaccination status of people who are congregating in public or using public and private facilities. There currently exists no quick and efficient solution to verifying the identity in these two domains and still requires improvement in the art.

What is needed is a system and method that makes it extremely simple for a person to immediately be verified for an ecommerce transaction or to be allowed entry into a controlled space.

SUMMARY

Accordingly, the inventor has conceived and reduced to practice, a system and method for a dynamic-link verification process between an electronic device and a transaction or event. The first step is engagement by a mobile electronic device with an initiator that is linked with a specific verification event that triggers a text message to auto-populate on a mobile electronic device. The message comprising metadata about the user and the event or transaction. The second step is for the electronic device to send the auto-populated message to a message gateway thus initiating the verification of the user. The message gateway works with a management service and one or more databases to verify the identify and other aspects of the user based on instructions provided by the event host. Approval or denial of the transaction or request to gain entry is sent to the mobile device and the event host. The event host may be an electronic device that when it receives an approval performs some action relating to the event or transaction.

According to a first preferred embodiment, a system for link-initiated dynamic-mode verification is disclosed, comprising: A dynamic-link verification platform comprising a first plurality of programming instructions stored in a memory of, and operating on a processor of, a first computing device, wherein the first plurality of programming instructions, when operating on the processor, causes the first computing device to: couple a stored verification event from one or more databases to an initiator ID, wherein the initiator ID is an identification marker unique to the stored verification event, and wherein the verification event comprises a host; embed the initiator ID into an initiator, wherein the initiator is an interactable object and when interacted with by a mobile computing device, is configured to auto-populate a text message on the mobile computing device; receive the text message from the mobile computing device, the message comprising the initiator ID and metadata about the mobile device; retrieve a verification rule associated with the initiator ID, wherein the verification rule comprises verification instructions; and execute the instructions contained in the verification rule, wherein the instructions cause the first computing device to: query one or more databases for information confirming the identity of the owner of the mobile computing device; and send a status notification to the verification event host.

According to a second preferred embodiment, a method for link-initiated dynamic-mode verification is disclosed, comprising the steps of: coupling a stored verification event from one or more databases to an initiator ID, wherein the initiator ID is an identification marker unique to the stored verification event, and wherein the verification event comprises a host; embedding the initiator ID into an initiator, wherein the initiator is an interactable object and when interacted with by a mobile computing device, is configured to auto-populate a text message on the mobile computing device; receiving the text message from the mobile computing device, the message comprising the initiator ID and metadata about the mobile device; retrieving a verification rule associated with the initiator ID, wherein the verification rule comprises verification instructions; executing the instructions contained in the verification rule; querying one or more databases for information confirming the identity of the owner of the mobile computing device; and sending a status notification to the verification event host.

According to various aspects; wherein the initiator comprises an interactable link to an Internet resource, a scannable QR code, or an NFC beacon; wherein upon successful verification of the owner using a third party data source, the verification status is saved to a local database; wherein the one or more databases is a distributed ledger; wherein a status notification comprising an approved status is received by the verification host, the verification host admits entry to a controlled space; wherein a status notification comprising a denied status is received by the verification host, the verification host denies entry to a controlled space; wherein a status notification comprising an approved status is received by the verification host, the verification host completes an ecommerce transaction; wherein a status notification comprising a denied status is received by the verification host, the verification host does not complete an ecommerce transaction; wherein a status notification comprises a status selected from a multi-level approval status scheme; wherein a status notification is also sent to the mobile computing device.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
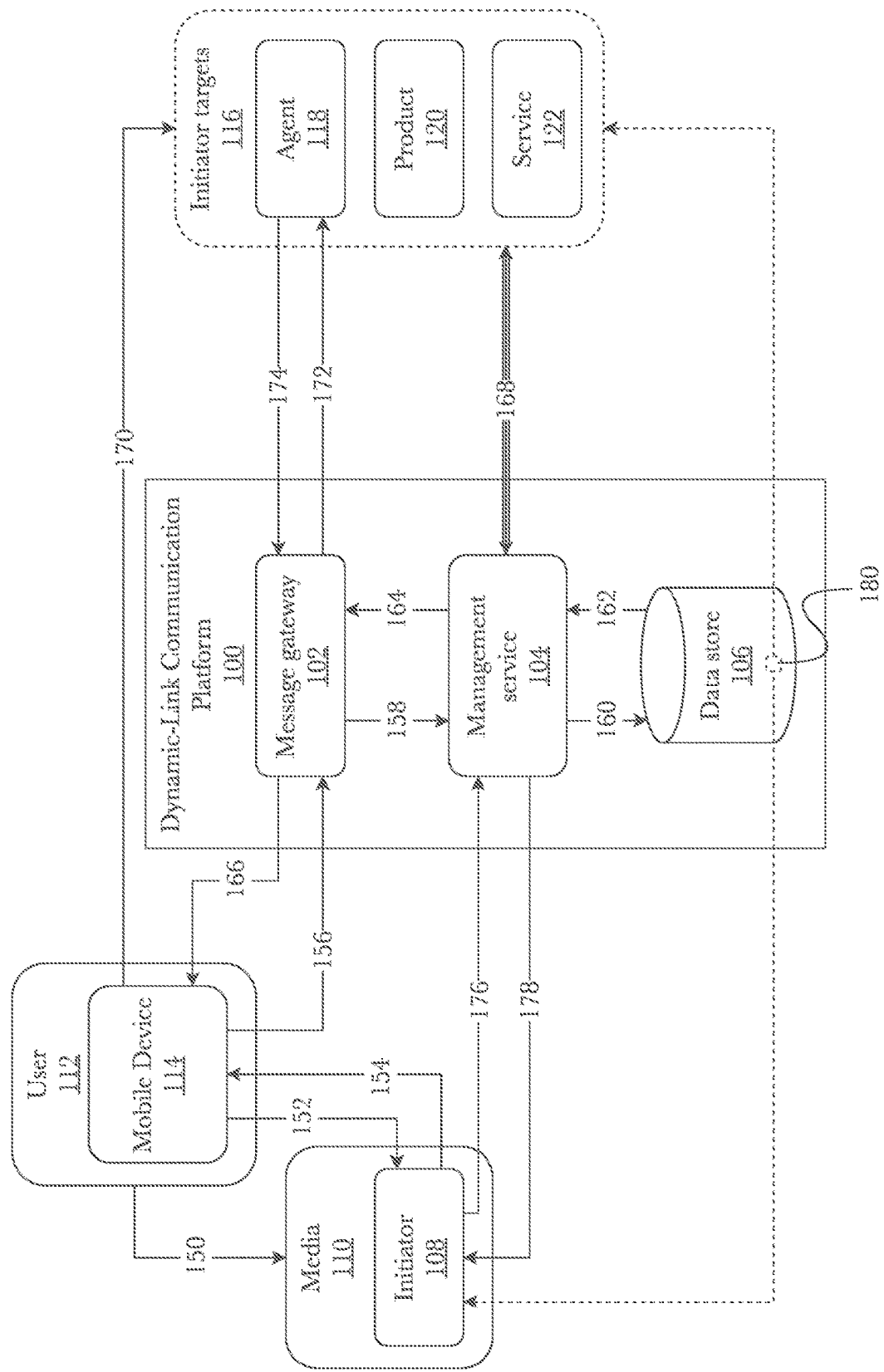
FIG. 1 is a block diagram illustrating an exemplary system architecture for a dynamic-link communication platform.

The inventor has conceived, and reduced to practice, a system and method for a dynamic-link verification process between an electronic device and a transaction or event. The first step is engagement by a mobile electronic device with an initiator that is linked with a specific verification event that triggers a text message to auto-populate on a mobile electronic device. The message comprising metadata about the user and the event or transaction. The second step is for the electronic device to send the auto-populated message to a message gateway thus initiating the verification of the user. The message gateway works with a management service and one or more databases to verify the identify and other aspects of the user based on instructions provided by the event host. Approval or denial of the transaction or request to gain entry is sent to the mobile device and the event host. The event host may be an electronic device that when it receives an approval performs some action relating to the event or transaction.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for a dynamic-link communication platform 100. Dynamic-link communication platform 100 links an initiator 108 with some type of content or call-to-action associated with a target product or service 116. An initiator 108 may take on many forms, a preferred form being a QR code, however other forms are anticipated in a non-exhaustive list in FIG. 8. The content served may also take many forms, a preferred form being a text or URL associated with a product 120 or service 122, however other forms are anticipated in a non-exhaustive list in FIG. 6. Actions are typically, but not limited to, communicating with some type of agent 118, be it a sales agent, technical support agent, or other types of representatives.

Initialization of dynamic-link communication platform 100 comprises storing content and rules associated with a product 120 or service 122 in some form of computer memory 106, i.e., in a database, federated data store, or distributed ledger, etc. The content and rules are assigned an initiator ID that is unique to that product 120 or service 122 and everything related to that product 120 or service 122 (e.g., content, rules, initiator ID, etc.) is called a campaign 180. The initiator ID may be autogenerated by an algorithm, or taken sequentially from a list, or other methods known to those in the art. Additionally, neither the content nor the rules together are a requirement, but each campaign must have at least one or the other or both. For example, a campaign for a product sold online may have no rules and the only content is a URL to the product page for that product. Or in another example, a marketing campaign attempting to get users 112 to speak to a sales representative may have only a set of rules that forward the user's 112 phone number to a phone number of the business. However, in some situations, there may be content and rules, whereby it may be possible to only forward the content based on some part of the user's 112 metadata embedded in the auto-populated message.

Other rules may comprise routing instructions or routing logic and may further use Artificial Intelligence ("AI") techniques known to those skilled in the art including deep learning algorithms and incorporate data resources as listed in previous paragraph along with an array of other factors including but not limited to time-of-day, day-of-week, store hours, resource availability, service level requirements, previous customer interaction and transactions, customer tiering structure, data from $3^{rd}$ party systems including but not limited to CRM systems, location-based services, weather-services and so forth.

With a unique initiator ID for a product 120 or service 122 in place, an initiator 108, such as a QR code, may be generated. It is not necessary to always generate the initiator 108 with a dynamic-link communication platform 100. According to one embodiment, initiators 108 may also be received alongside the content and rules. Generated initiators 108 may be sent, forwarded, printed, mailed, or hosted on some form of media 110. Media 110 in this sense is referring to the many forms that an initiator may be placed. A non-exhaustive list includes printed materials such as billboards, posters, and flyers; and electronic means such as online advertisements, embedded advertisements, URLs, push notifications, streaming media, etc.

With the dynamic-link communication platform 100 initialized, a user 112 will observe 150 media 110 with an initiator 108, use his or her device—such as a mobile device 114—to engage 152 with an initiator 108, for example scanning a QR code, which will trigger the device 114 to auto-populate a text message 154. The user 112 will simply press the send key/button to send the message 156. In the case the initiator 108 is a QR code, then the destination of the message and other data may be embedded in the QR code such that the embedded data is then transferred along with the message to the dynamic-link communication platform 100 so that the dynamic-link communication platform 100 knows the context in which the message was sent. In almost every case there may be a way two derive context from a message. Take for example, three billboards all directed to the same product 120/campaign but each containing a different phone number, where the phone number is the initiator 108 and shares the same initiator ID. In this case a user will dial the phone number and be returned the content (e.g., a text message with the product information) and the number that was dialed gives context as to the location of the billboard and the user 112. In a case where the media 110 does not allow for context, but the initiator 108 has Internet access, the initiator 108 may communicate 176/178 with the management service component 104 of a dynamic-link communication platform 100 in order to provide context as well as deliver and confirm compliance with rules if applicable.

The message sent 156 from the device 114 is received by a message gateway 102 and forwarded 158 onto a management service 104. The message gateway 102 receives and sends messages from various modes of communication, e.g., text, email, voice, and other protocols. The initiator ID contained in the message is used to query 160 a data store 106 which will return 162 any content and rules associated with that initiator ID. Upon compliance with any rules, and if there is content to be delivered back to the device 114, then the content is sent 164 to the message gateway 102 for sending 166 back to the device 114. If the message was a request to communicate with an agent 118, then upon compliance with any rules, the message or content will be sent to the message gateway 102 for delivery 172 to the agent 118. The agent 118 if applicable, will send a return message 174, and that return message will again go to the management service 104 for rule compliance before being delivered to the device 114. Some content to be delivered to the device will contain external links 170 to the products 120 and services 122. Content, rules, and provided initiators 108 may be dynamically updated via communication lines 168 with the initiator targets 116. For example, if the URL to a product changes, the product owner may push updated content to replace the old content in the data store 106.

Customers/users and their devices 114, agents 118, 177 and their business user mobile device(s), other business user device(s), and TCPA compliant mobile device(s) used by agents 118, may connect to a dynamic-link communication platform 100, typically via a cellular phone network, although connections may be made through other means, as well, such as through the Internet via a Wi-Fi router for example. Similarly, devices may connect to over a Local Area Network ("LAN") or Wide Area Network ("WAN"), the Internet, a direct physical connection to another device, or some other network connection. Dynamic-link communication platform system 100 may connect to 3$^{rd}$ party or external systems or components, such as Customer Relationship Management ("CRM") systems, Private Branch Exchange ("PBX"), traditional telephony call center agents, voicemail systems, and so forth, through 3rd party data gateway.

Figure 2:
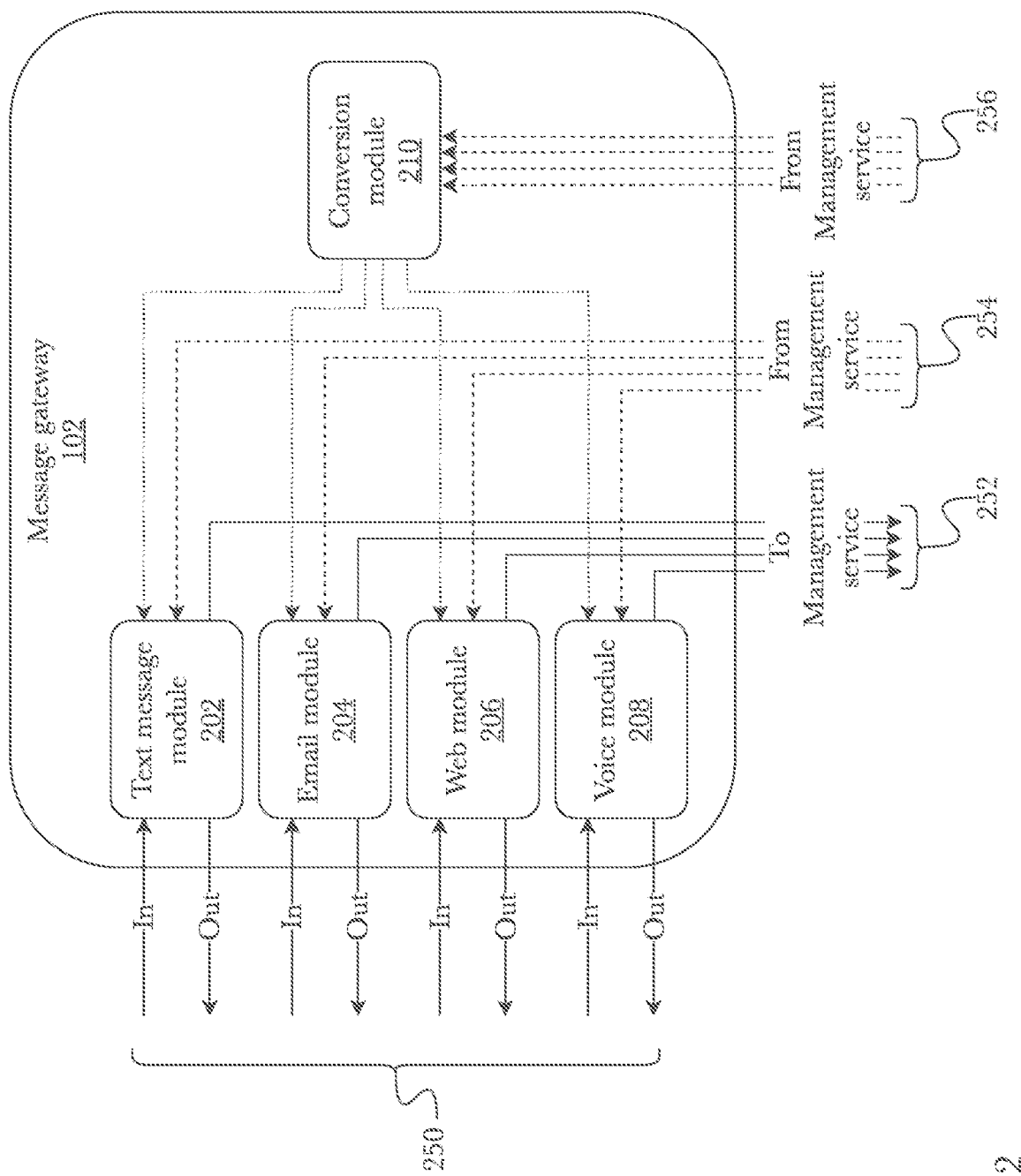
FIG. 2 is a block diagram illustrating an exemplary architecture for message gateway.

FIG. 2 is a block diagram illustrating an exemplary architecture for message gateway. The message gateway 102 may comprise various modules 202-208 which send and receive 250 different modes of communication. A conversion module 210 may be implemented which is dedicated to converting between different modes of communication. However, the arrangement of these modules and their inherent functions need not be arranged in the manner illustrated in FIG. 2. Another anticipated embodiment employs third-party gateway services where and if possible, such as an SMS-to-email gateway, however it may be more efficient to centrally perform the conversions, especially with regard to privacy.

Messages received 250 by the modules are sent to management service 252. The returned content or response messages from the management service may already be formatted in the proper format for the respective module 254. Returned content or response messages not properly formatted 256 may get formatted by the conversion module before going out to the proper module 202-208.

Figure 3:
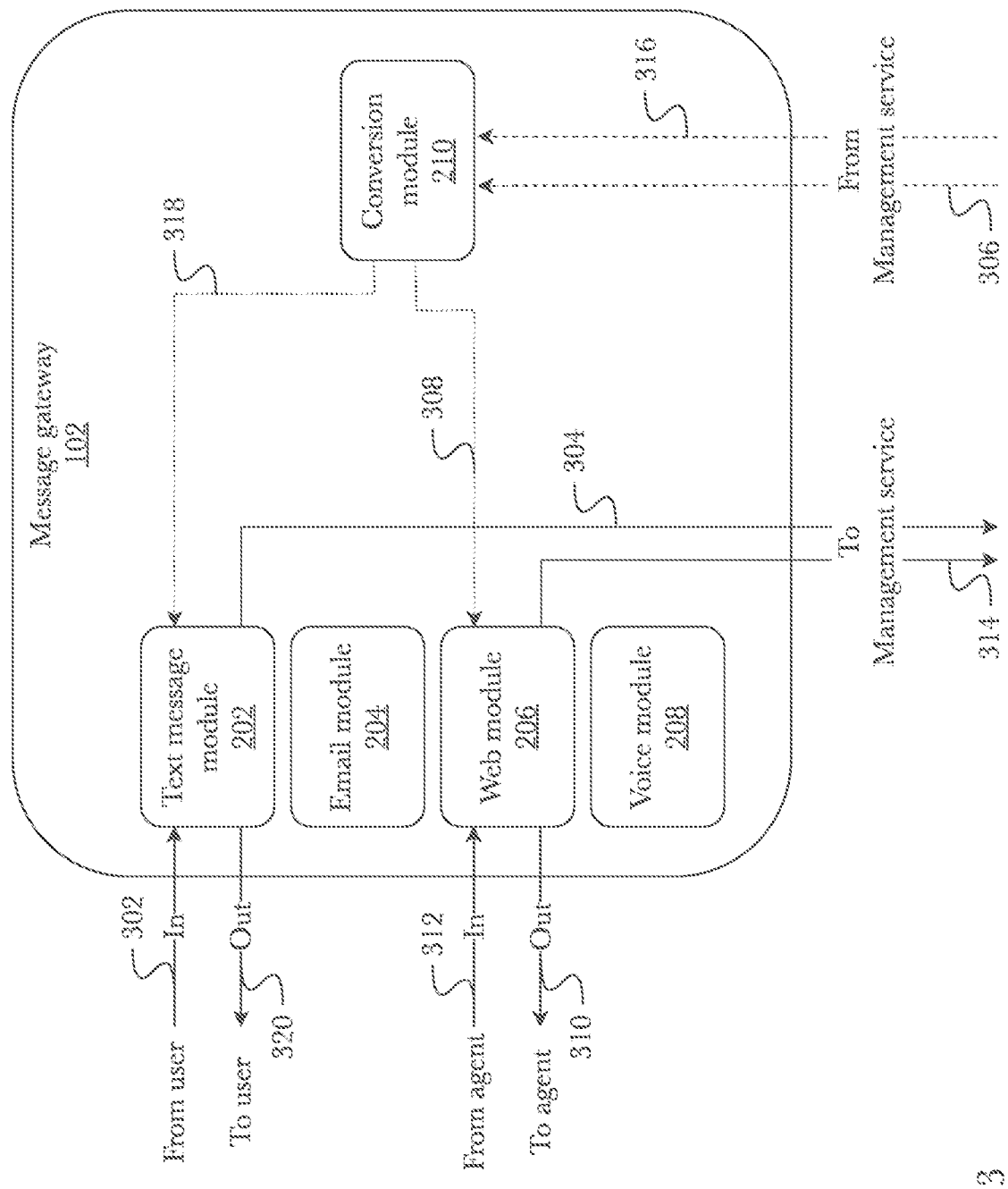
FIG. 3 is a block diagram illustrating an exemplary use of a message gateway.

FIG. 3 is an example of a user engaging with an initiator that is intended to connect the user with a sales agent using a web-enabled chat interface. A user will interact with an initiator and then send the generated message which will be received 302 by a text message module 202. The text message module 202 may contain instructions to send and receive wireless protocols typically used for mobile devices such as SMS, MMS, iMessage, RCS, etc. The message is sent to the management service 304 where the initiator ID from the message will identify the campaign and subsequently at least one or more agents to query if they may respond to the request. The rules of the campaign may set forth what content the message to the agent contains. For example, the first message may just contain a query to approve or deny the request. According to another embodiment, the original message plus any metadata about the user or request may be slotted into an agent's queue. Many possibilities exist as to what the messages may contain and are not limited to the examples set forth herein. Irrespective of what the messages may contain, a message is sent to an agent 308/310 via the web module 206, however not before the text message is converted into the appropriate format 306 for the web module 206. The response from the agent 312 is sent to the management service for rule compliance 314 and then back 316 to the message gateway 102 conversion module 210 so that it may be converted into a text format to be set to the user 318/320.

Figure 4:
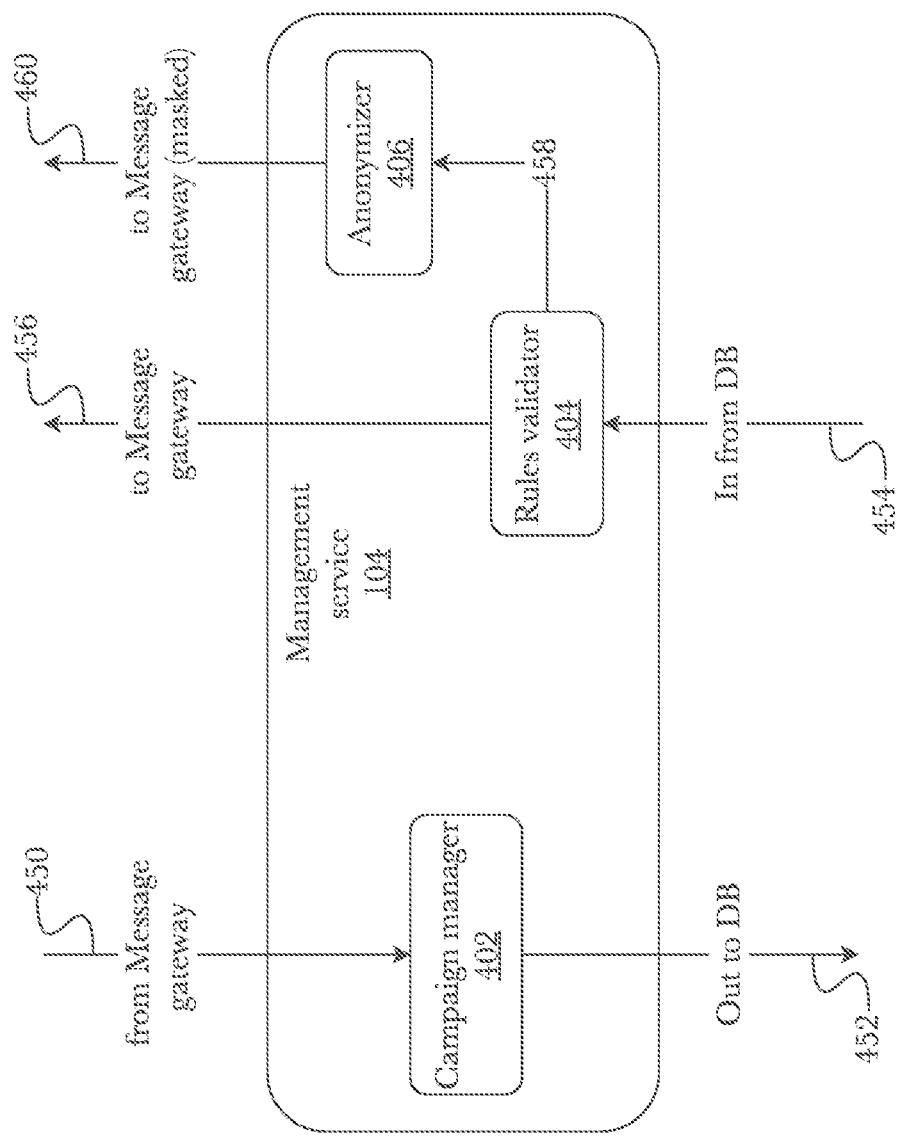
FIG. 4 is a block diagram illustrating an exemplary architecture for a management service.

FIG. 4 is a block diagram illustrating an exemplary architecture for a management service 104. Messages from the message gateway are received 450 by the management service 104 and a campaign manager 402 uses the message initiator ID to retrieve the associated content and rules from one or more databases 452/454 and sends the rules to a rules validator 404. If there are no rules and only content to be served, then the content will simply be sent out to the message gateway 456. If a campaign from the one or more databases does contain one or more rules however, the rules validator 404 ensures that all the requirements of the campaign are met before sending the content or executing a specific action is performed. One example is that a rule may dictate that the message be stripped of private information before it is forwarded or used, and in such a case, the message will be sent to an anonymizer 406 before the message is sent 458 to the message gateway 460. The anonymizer 406 removes personally identifiable information (PII) from messages using machine learning algorithms such as natural language processing or natural language reasoning. Rules may go as far as being employed to prescreen the source of the message using the metadata embedded into the message as a way to discriminate whether or not the contents of the campaign may be allowed to be sent to the message sender.

Figure 5:
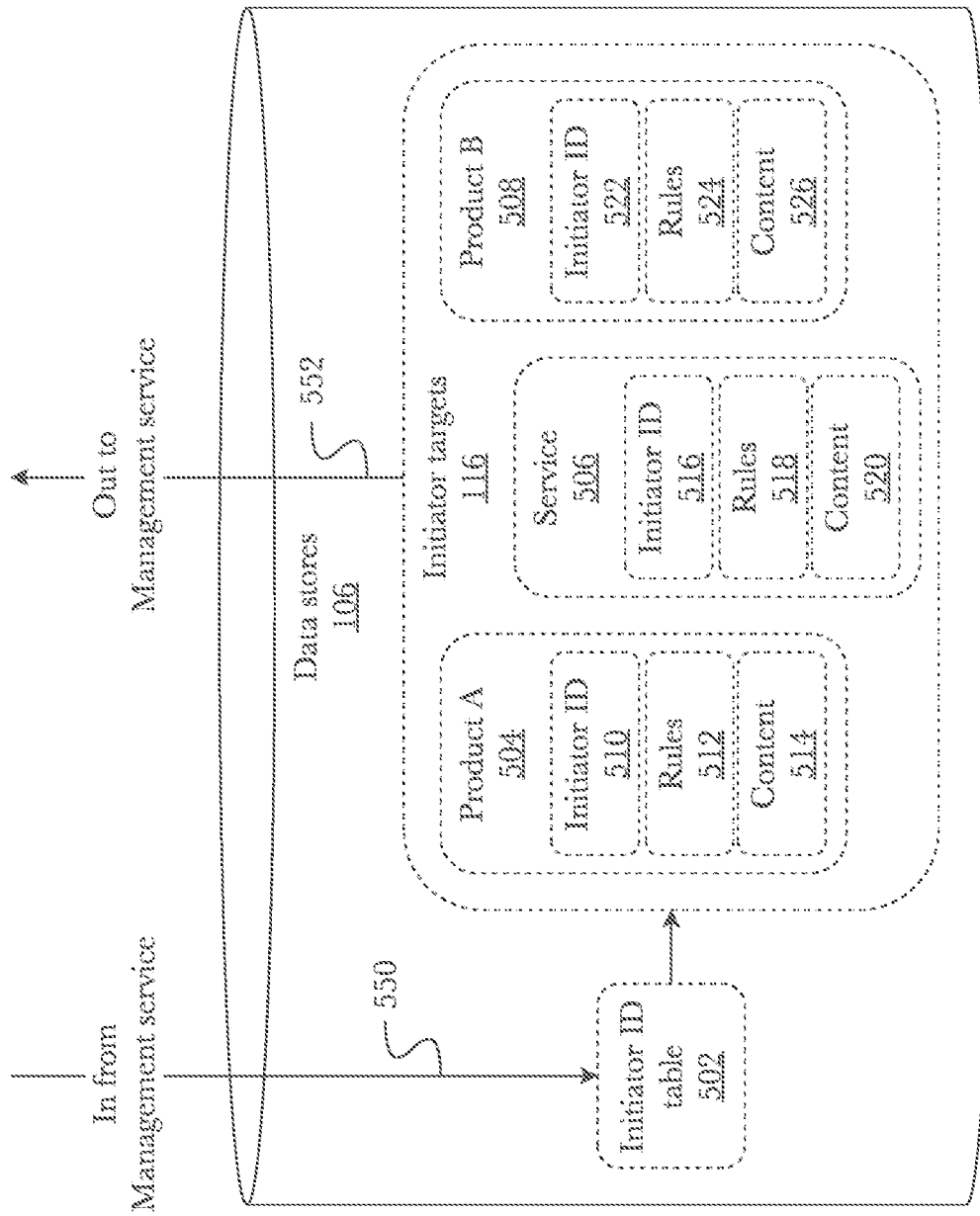
FIG. 5 is a block diagram illustrating exemplary data within one or more data stores.

FIG. 5 is a block diagram illustrating exemplary data within one or more data stores 106. This diagram illustrates an exemplary logical representation of one way to organize and store data associated with an initiator in one or more data bases. In this arrangement an initiator ID table 502 stores a list of initiator IDs, each of which are linked with a memory address associated with each initiator target 116, i.e., campaign 504508, in the data store. In this way, content and rules may be efficiently retrieved from the management service 550/552. According to this embodiment, each campaign 504-508 has at least their own set of rules 512/518/524, content 514/520/526, and an initiator ID 510/516/522.

Database(s) 106 may take the form of a managed or unmanaged database, document-oriented database system, or a Structured Query Language ("SQL") database. Examples of types of database software that may operate include MYSQL™, ORACLE DATABASE™, MONGODB™, and others. It may exist as a distinct physical device or be operating on another computing device that may perform other functions aside from operating, hosting and serving the database 106. If it is a distinct physical device, the database may be connected over a LAN or WAN, the Internet, a direct physical connection to another device, or some other network connection.

Figure 9:
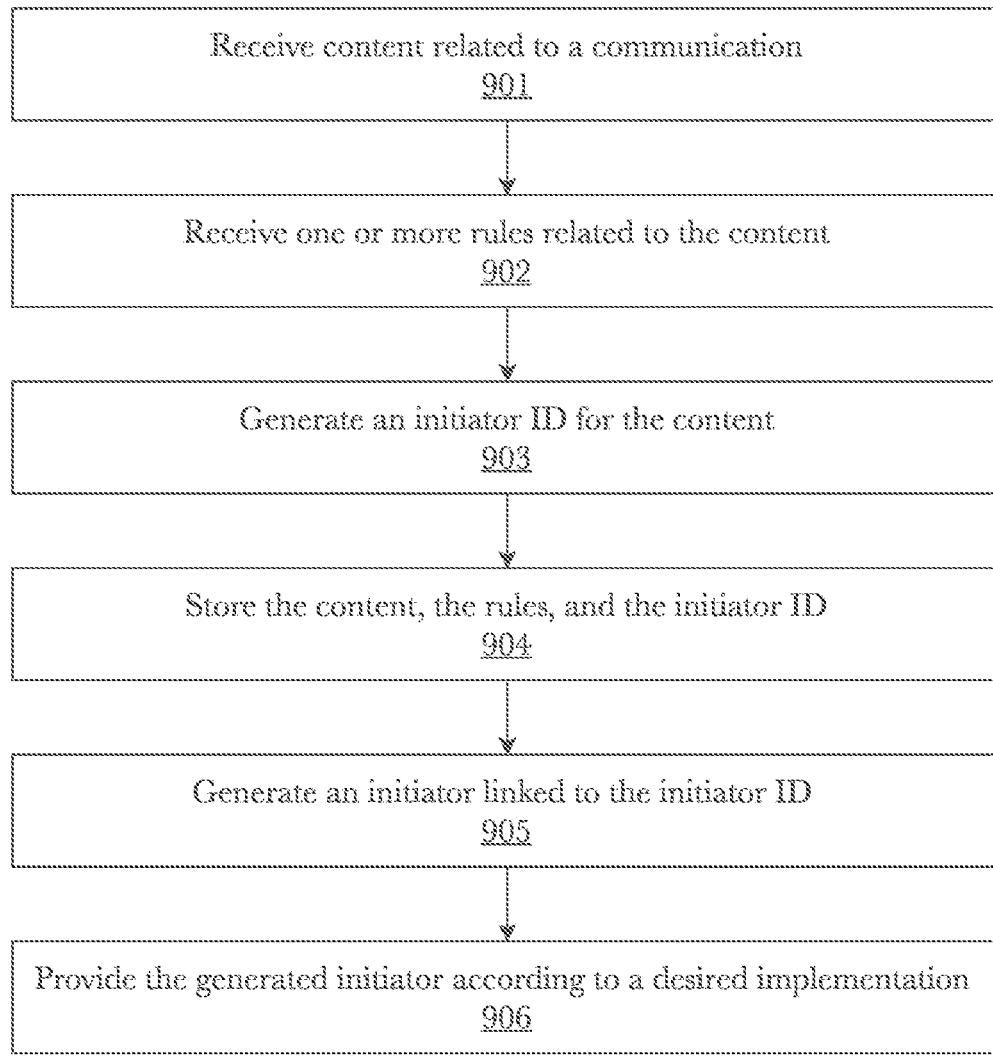
FIG. 9 is a flow diagram illustrating an exemplary method for initializing a dynamic-link communication platform.

FIG. 9 is a flow diagram illustrating an exemplary method for initializing a dynamic-link communication platform. Regarding the steps in this diagram, there is no strict requirement for the steps to be in this particular order. For example, content and rules may be received at the same time and stored before the initiator ID is generated. It will be appreciated by those skilled in the art that the general process is to populate a database with the content to be served, the rules related to how that content is served and to whom, and then to generate and link an initiator and initiator ID such that it may actually be served.

In a first and second step 901/902 content and one or more rules related to the content are received. In a third step 903, an initiator ID is generated or retrieved for the campaign, where the campaign is all of the data associated with that particular product or service. Initiator IDs may be issued sequentially or according to an algorithm, and the initiator ID's may also be used to identify campaigns, if so desired. In a fourth step 904, the content, rules, and initiator ID are stored in a database as a campaign. In a fifth step 905, an initiator is generated according to the provisions of the campaign. It is also anticipated that an initiator does not necessarily have to be generated, but may also be received along with the content and rules. It should be understood that whether an initiator is generated or received, it is inherently linked with the initiator ID of the associated campaign. In a six step 906, the initiator is deployed according to the stipulations of the campaign. It is anticipated that there may be many initiators taking various forms of which all link to one initiator ID.

Figure 10:
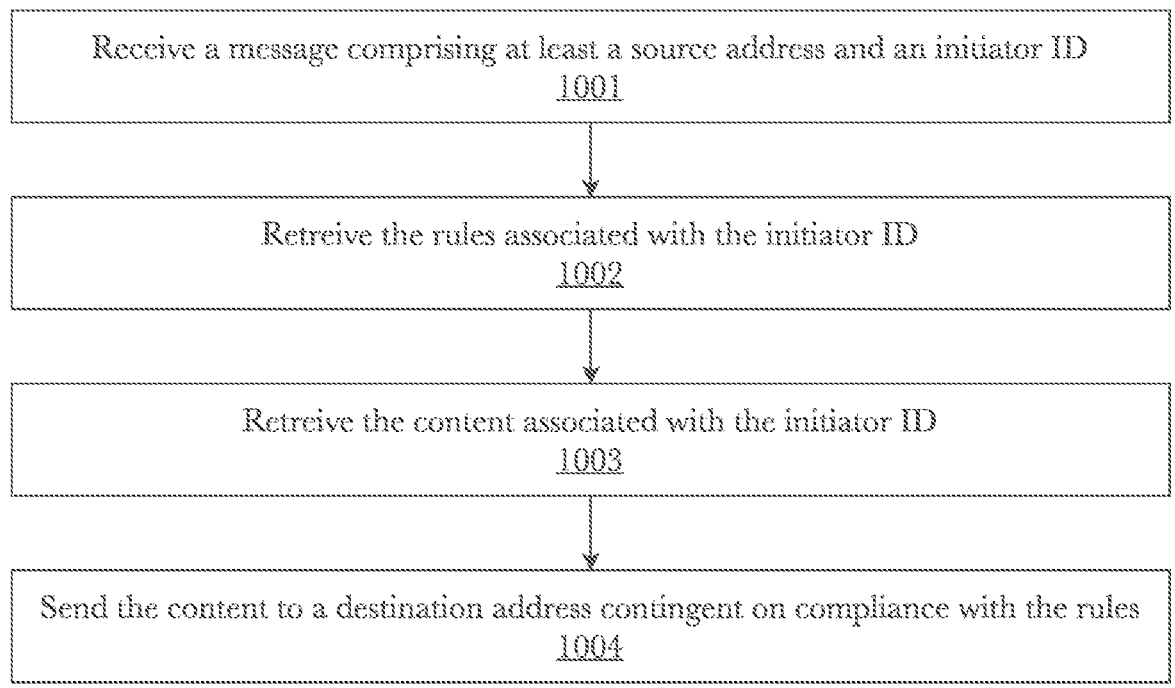
FIG. 10 is a flow diagram illustrating an exemplary method for implementing a dynamic-link communication platform.

FIG. 10 is a flow diagram illustrating an exemplary method for implementing a dynamic-link communication platform. In a first step 1001, a message is received comprising at least the originating source address and an initiator ID. In a second step 1002, rules associated with the initial ID are retrieved. In a third step 1003, content associated with the initiator ID is retrieved. In a fourth step 1004, the content is sent, or the action triggered by the rules is executed, only upon compliance with the rules associated with that campaign.

Figure 11:
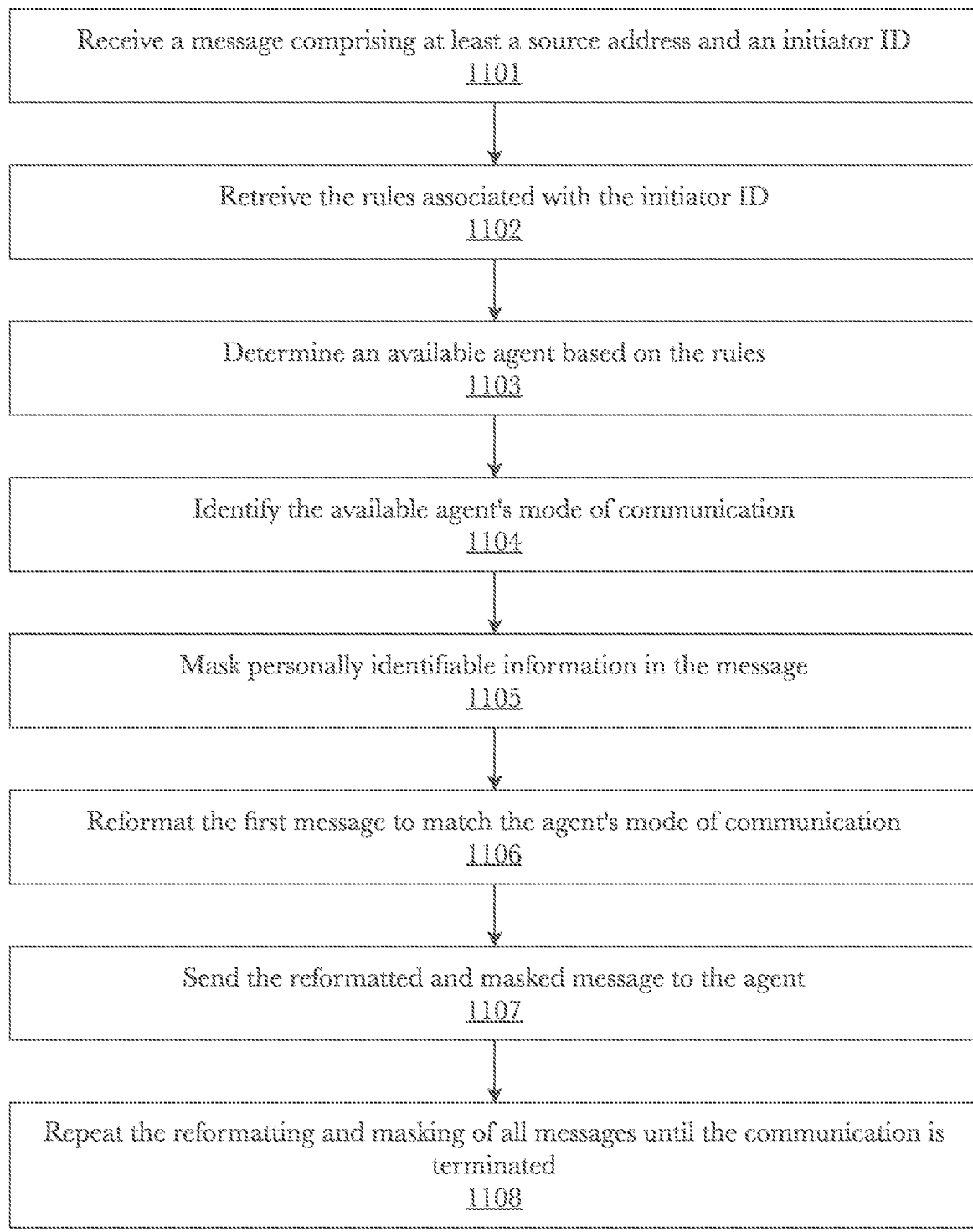
FIG. 11 is a flow diagram illustrating an exemplary method for facilitating multimodal communications.

FIG. 11 is a flow diagram illustrating an exemplary method for facilitating multimodal communications. In a first step 1101, a message comprising at least an originating source address and an initiator ID is received. In this case, the campaign—via the initiator—generating the message is intended to initiate a communication between the user and an agent. More particularly, initiate and facilitate a privacy-compliant communication between a user's device and an agent's device. In a second step 1102, the initiator ID is used to retrieve the rules for the campaign. In a third step 1103, the rules are used to determine which agent contact and when. In a fourth step 1104, the selected agents mode of communication is identified. Additionally, in this scenario, the motive communication of the user and the motive communication of the agent or not the same. In a fifth step 1105, personally identifiable information is masked or removed in the message received in step 1101. In a sixth step 1106, the message received in step one 1101 is reformatted to match the agent's mode of communication. In a seventh step 1107, the masked and reformatted message is sent to the agent. In an eighth step 1108, all subsequent messages of the communication between the user's device and the agent's device are formatted and masked appropriately until the communication is terminated.

Figure 16:
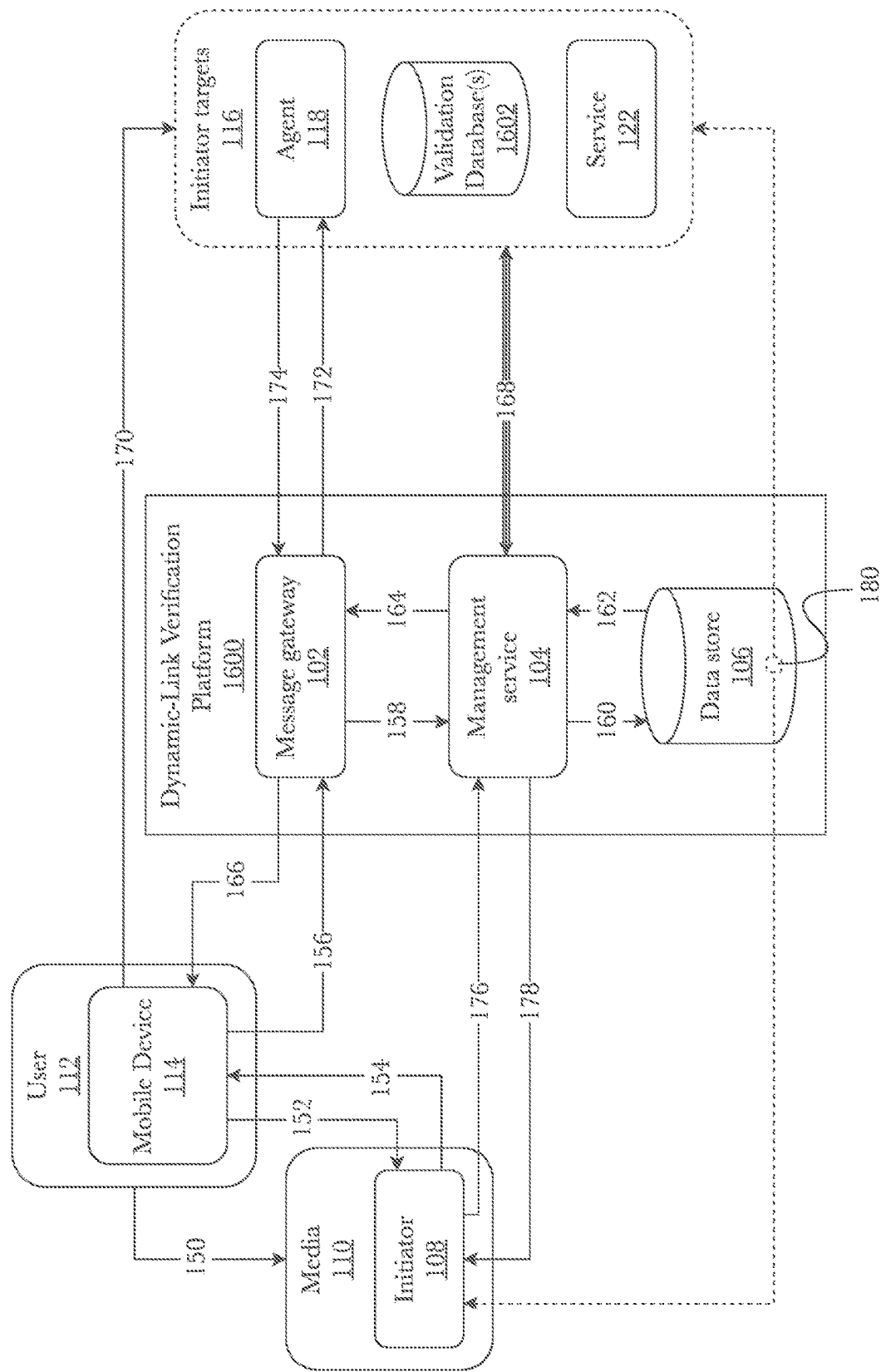
FIG. 16 is a block diagram illustrating an exemplary system architecture for a dynamic-link verification platform.

FIG. 16 is a block diagram illustrating an exemplary system architecture for a dynamic-link verification platform 1600. A dynamic-link verification platform 1600 functions in much the way of a dynamic-link communication platform 100 in FIG. 1. However, one or more validation databases 1602 have taken the place of a product for use in authorizing individuals at business establishments, public parks and venues, and other places where authorization/validation may be utilized. In general, a user 112 attempts to conduct an ecommerce transaction or attempts to enter a controlled space. In both scenarios, an initiator 108 may be presented to the user 112 so that the mobile device 114 may interact with the initiator 108 whereby the initiator 108 triggers the mobile device 114 to auto-populate a text message relating to the ecommerce transaction or the request to gain entry into the controlled space. It is possible that more than one initiator 108 is present such as the case if there are multiple events at one venue, and other like-situations. The mobile device 114 sends the auto-populated text message and it is received by the message gateway 102. The text messages forwarded on to the management service 104 where the initiator ID is used to retrieve a rule relating to the e-commerce transaction or request for entry, or as defined hereafter a verification event. The rule contains instructions for the management service 104 to perform in order to verify the owner of the mobile device 114. Rules may comprise various instructions, some of which are disclosed in the following examples.

A first example may be used at a concert and requiring users to have full vaccination status against a coronavirus in order to gain entry. The instructions contained in the rule in this scenario may be to use the phone number of the mobile device 114 against the billing information associated with the mobile device's 114 carrier to determine the name of the user 112. Subsequently, use the name on the billing information against the CDC's vaccination whitelist. Then, contingent on the successful verification of the first two steps, compare the name of the vaccinated user against the guest list provided by the verification event host. Lastly, send an approval notification to the event host. It should be noted that the event host is not a person, but may be another electronic device which may unlock a gate, send a message, activate the printer, complete a transaction, etc.

A second example may be an ecommerce transaction where in the consumer is attempting to purchase alcohol that is restricted to anyone under the age of 21 years old. The instructions in this scenario may require the user to provide biometrics on the mobile device 114 and use the biometrics to compare against a government database.

According to one use case, a consumer may go to an ecommerce website to purchase a product or service that requires his or her identity to be verified. On the product page 110 for that ecommerce item, there may be a selectable item—i.e., an initiator 108—such as a link or a button that may say something to the effect of "verify" or something of the like. When the consumer 112 interacts with this initiator 108, a message will be auto-generated on their mobile device 114. The message destination will go to a dynamic link verification platform 1600 so that the management service 104 can first check any local data stores 106 to see if the validation may be confirmed, and if not reach out to one or more validation databases 1602 over a network. Validation of the user 112 of the mobile device 114 may happen in the following non-exhaustive list of examples: a third-party reverse lookup service matching the phone number to the consumer's name; matching some or all of the billing information of the mobile device to the consumer's name; using API's of other third-party verification databases, or using verification methods present on the mobile device—e.g., biometrics, security applications, and partner applications. According to one embodiment the data store 106 may be used to store the user's 114 validation status. In this way, a data store 106 may build up a list of users who are pre-verified and to what extent they are pre-verified. According to one aspect, a distributed ledger may provide a private and secure means to store such a pre-verified list of users. Upon verification of a user's identity, the dynamic-link verification platform 1600 may send an approval to the ecommerce provider so that the transaction may be completed.

An additional use case may be using a validation platform 1600 to control entry into a public place, event, or venue based upon the condition that the individual has the appropriate vaccines. The management service 104 may reach out to a federated database comprising databases such as the CDC, hospital chains, etc. It may use the same local data store 106 and distributed ledger as mentioned previously. There may be multiple levels of validation depending on the context of the situation. For example, it is possible that a user has all of his or her vaccines and it is recorded as much in a database and upon a validation request, the user is verified as green, signifying that the user may attend the current and all future events contingent on the fact that the rules don't change regarding what vaccinations are required period. However, consider a second person who is also fully vaccinated but their vaccination information has yet to be uploaded to any database. This person may be manually verified by a person working the gate at a public event, such that after manual verification, the user's status may be stored in the local database 106 as yellow, signifying that they are only validated this one time and they must be validated again the next time they visit any establishment. It may be also that a user is not able to be manually or automatically verified according to their vaccination status, therefore a user 112 requesting to get in using their mobile device 114 and engaging with an initiator 108 would be denied entry and would be flagged as red signifying that they are not allowed entry into the event. The different verification levels—green, yellow, and red—may be used to print out wristbands of different colors, or provide different information in the form of a text message to the mobile device. The different statuses may be used to control what areas of the venue the person is allowed to be at. For example, at a restaurant, a user with a green status may be able to dine indoors while users with only a yellow status may only dine outdoors. With regards to providing different information in the form of a text message, keep in mind that the dynamic link verification platform 1600 has the capabilities to store that information and provide it upon receiving the auto-populated text message from the mobile device 114, as disclosed in at least FIG. 1.

Figure 17:
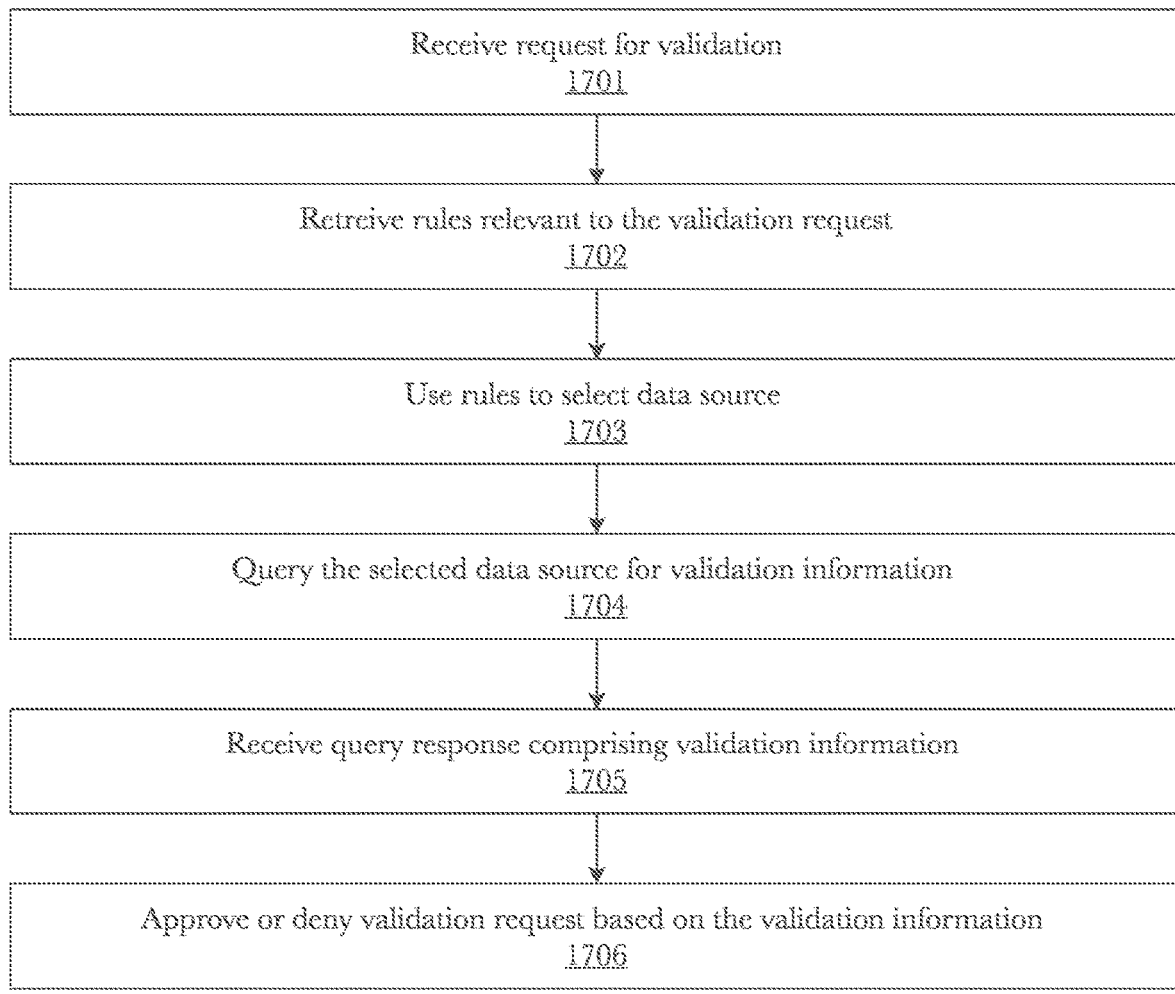
FIG. 17 is a flow diagram illustrating a method for verifying a user via a mobile device and reverse lookup.

FIG. 17 is a flow diagram illustrating a method for verifying a user via a mobile device and reverse lookup. As described in various previous figures, the general invention is a system and method for initiating some form of communication between at least two entities. This communication is initialized by providing a user with a mobile device some means by which they may initiate a communication related to some product or service the person is interested in. Such means may comprise a billboard with a phone number or a URL, or an advertisement on a bus stop with a QR code, or may comprise an online advertisement that is selected or clicked by the user, among many other options and combinations. When the user interacts with the advertisement (e.g., goes to the URL, clicks on the advertisement, scans a QR code, etc.) a text message is auto populated on the user's device. As fully described in the previous figures, but generally re-described here, is that the means to produce both the content of the text message and the text message itself may happen in various ways. The content of the text message may be retrieved from the URL, or may be embedded within the QR code, or originate from the advertisement that was selected. As with the exemplary means in the previous statement, each means may also have a way to embed other contextual information for the purposes of communication satisfaction. This "other context" may include the time the interaction was initiated, locality data, identifying information from the mobile device or user, campaign matching information, and other data and metadata useful for such interactions. Once the text message and all of its content is populated on the users device the user may just simply hit the send button. That text message is now received by a service that facilitates a privacy compliant communication relevant to the advertisement/product/service. One example is when a user selects an online advertisement, say to buy specific car, information from the user's device and information contained by or retrieved by the advertisement campaign is used to auto populate a message which is then sent by the user. That text message and the relevant information is used by service to find and connect the user with an agent at the dealership and even further mask any private information on both ends of the communication, i.e., remove all personally identifiable information such as phone numbers and names.

FIG. 17 comprises a method of adding a validation service to the system and method described above. Where a user will still interact with some form of media, advertisement, or content, but where the interaction further requires that the user be validated. Many levels of verification are anticipated. One verification method comprises using the phone number of the mobile device which initiated the communication to perform a reverse lookup and compare the person associated with the phone number (or billing information) with the person attempting to initiate the interaction. This verification method can be supplemented with any level of authentication so desired. This may mean a username and password, biometrics, some third party authentication service, and other types of authentication services in use. If the user has been successfully verified, then an approval to complete the transaction, allow entry, or some other action may occur. Using the example of the car advertisement, a user may be pre-verified or preauthorized for the vehicle purchase just by authenticating themselves when they click on the advertisement. This can apply generally to any ecommerce platform. Furthermore, the validation service may comprise a federated data store or a distributed ledger, private or public, or other forms of robust data services needed to facilitate authentication transactions. Databases and data store services may be local or distributed or some combination thereof. For example, a local database may be populated from a federated data store as users are validated, removing the need to query the federated data store if a user already exists as validated in the local database. The validation service may also comprise a set of rules, also the rules may be local or retrieved from some rules database, and the rules tell the service how to validate, at what level to validate, and at what level each person is validated—if there is more than one level of validation. One example of this, is where a person requesting access into a public venue is provided access to certain areas only if they have received one or more vaccines. In such a case it may be that the person is not verified of receiving the vaccine if any of the databases within the federated data store reflect as much, but the person has received a valid vaccination card that can be verified manually by someone at the gate/entry. Such a case may happen if the person has just received a vaccine and that information has not been entered into any of the databases. And if that is the case, then it is possible to flag the user as validated and allow them access to the venue but perhaps not into specific areas or that the person is only allowed access for a specific period of time and must always be reverified until the federated or local data store reflects the manual verification of the vaccine card. The local database may use many types of technologies, one anticipated method is to use a private blockchain to better protect against privacy and HIPAA violations.

In a first step 1701, a request for validation is received by a validation service. This request may comprise information pertaining to the person or device for which the validation is requested. The request may also comprise information relating to the type of validation or reason for the validation which may be used to determine which rules are relevant to completing the validation request 1702. There may be many rules contained within a rules database or within the validation service. For example, the validation service may be used to perform validations of vaccinations, e-commerce transactions, sales leads, etc. In other words, a request for validating a person or device is received which comprises information which allows the validation service to know how to validate and where to validate from for the request. With the proper rules selected, the validation service now selects the appropriate data sources 1703 from which to query for the purposes of obtaining validation information related to the validation request of the person or device 1704. The rules may tell the validation service where to find the address or location of one or more data sources. The rules may point to a local table, array, or any other type of data storage means by which the logical addresses of data stores may be contained. Once a response to the query containing the appropriate validation information is received 1705, the validation information is compared to the rules which provide a means to know whether the person or device is validated and at what level—should more than one or two levels exist, i.e., the rules confirm approval or denial of the validation request based on the validation information which may then be forwarded onto the requester of the validation 1706.

As previously stated, it is anticipated that a local data store may save the results of these validation requests such that any subsequent validation requests matching the initial request may be first retrieved from the local data store thus increasing the speed and efficacy of the request process rather than querying federated data stores each iteration.

Detailed Description of Exemplary Aspects

Figure 6:
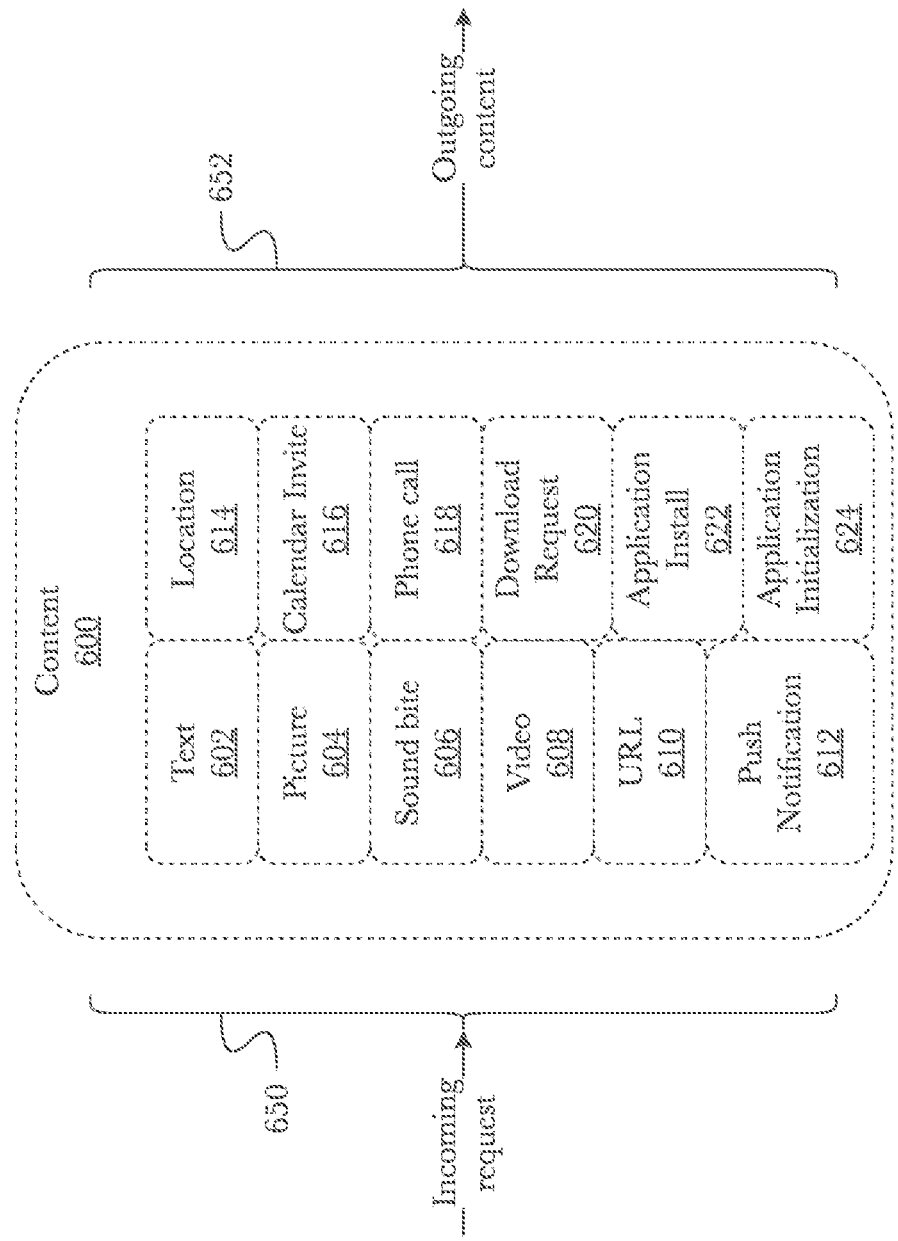
FIG. 6 is a block diagram illustrating exemplary content that may be served by a dynamic-link communication platform.

FIG. 6 is a block diagram illustrating exemplary content 600 that may be served 650/652 by a dynamic-link communication platform. Content that may be stored and served via a dynamic-link communication platform may comprise text 602, pictures 604, sound bites 606, videos 608, URLs 610, push notifications 612, location data 614, calendar invites 616, phone calls 618, download requests 620, application install request 622, and application initializations 624. Much of this content may be sent over MMS or other messaging services, attached to emails, or hosted in the cloud that may be linked in emails and texts, or hosted elsewhere and sent via URL's, among many other possible combinations known in the art.

Figure 7:
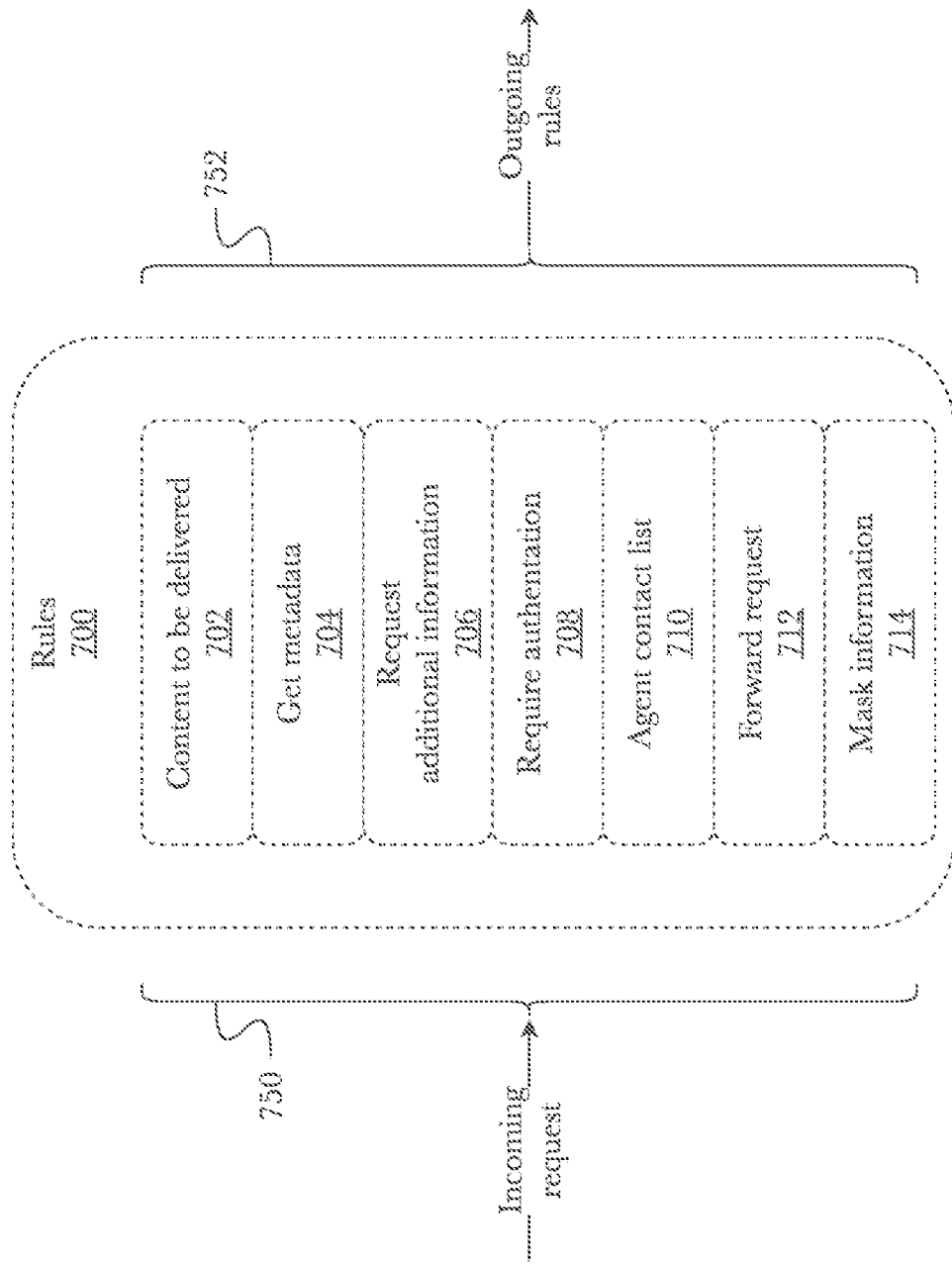
FIG. 7 is a block diagram illustrating exemplary rules that may be used by a dynamic-link communication platform.

FIG. 7 is a block diagram illustrating exemplary rules 700 that may be used by a dynamic-link communication platform. A non-exhaustive list of exemplary rules 752 that may be used against an incoming request 750 comprises: what content may be delivered 702, what kind of metadata to retrieve from the device 704, whether or not to send subsequent messages to the device requesting additional information 706, and whether or not the content requires authentication 708. Rules may be an algorithm comprising a list of agents such that the algorithms perform a round-robin style query to find an available agent, and other like algorithms 710. Rules may simply forward messages to a system, device, or agent 712. Other rules may require that certain information be masked for privacy and regulatory compliance 714.

Figure 8:
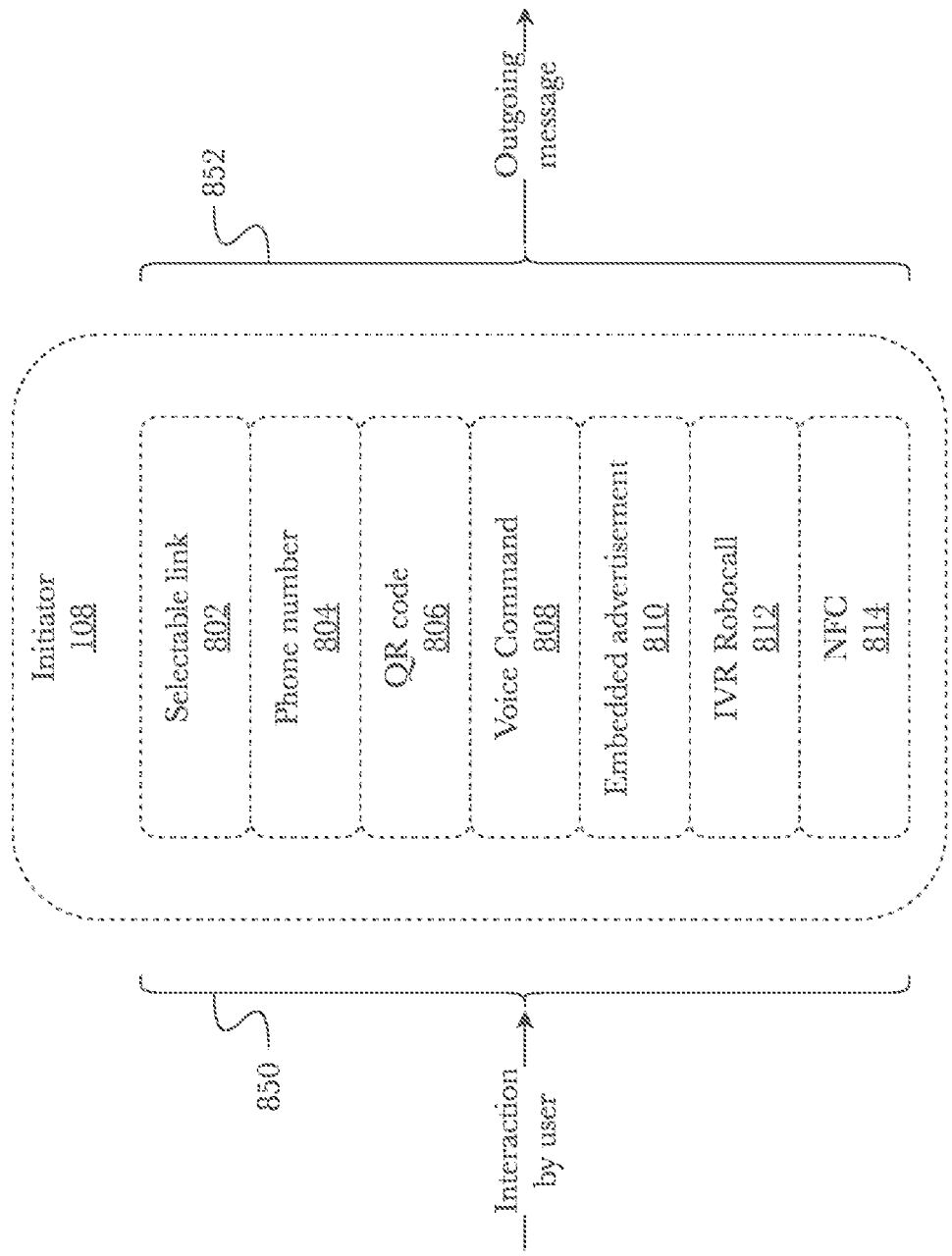
FIG. 8 is a block diagram illustrating exemplary initiators used to facilitate dynamic-link communications.

FIG. 8 is a block diagram illustrating exemplary initiators 108 used to facilitate dynamic-link communications. As illustrated by the diagram and the many initiator forms 802-814, it can be seen that an initiator 108 may take the form of anything that allows the user to interact 850 with the initiator 108 such that a device used to engage with the initiator can be commanded to auto-populate a message on the device 852. Tappable content on a mobile device or clickable links from a desktop for laptop computer may be used 802. Phone numbers on a printed advertisement can be dialed by the user in which an automated system on the other end of the line automatically responds with a text message to the calling device 804. QR codes are suited very well for this purpose as they may embed a plurality of information pertinent to efficient two-way communications 806. Another example may be a voice command that may be displayed to a user such that the user may say the voice command to a virtual assistant 808 on his or her device to initiate the communication. According to another embodiment, a purpose-built application for a dynamic-link communication platform may comprise its own virtual assistant and may also add increased functionality to a dynamic-link communication platform system. Advertisements embedded within applications and software programs 810, interactive voice response robocalls 812, and near field communication technologies 814 are all other examples that may be used as initiators 108.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 12:
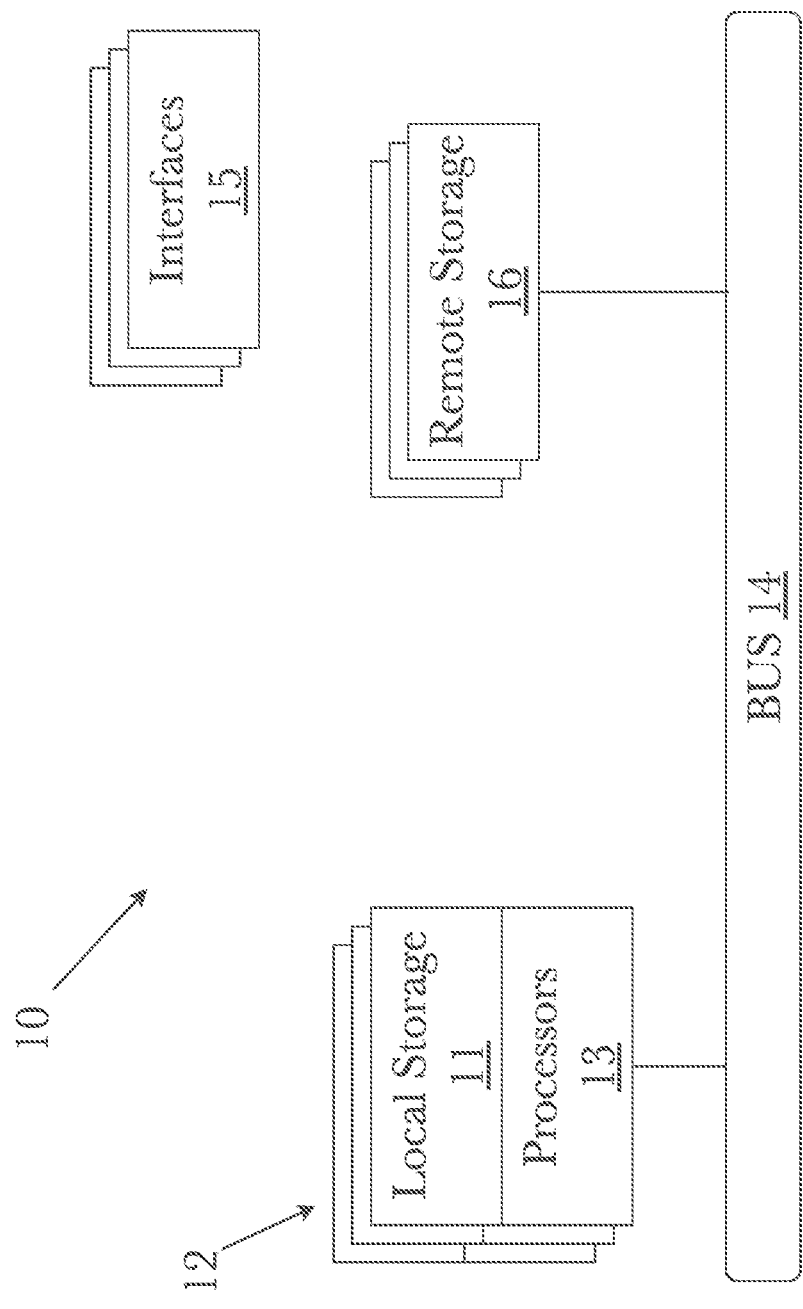
FIG. 12 is a block diagram illustrating an exemplary hardware architecture of a computing device.

Referring now to FIG. 12, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 12 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 13:
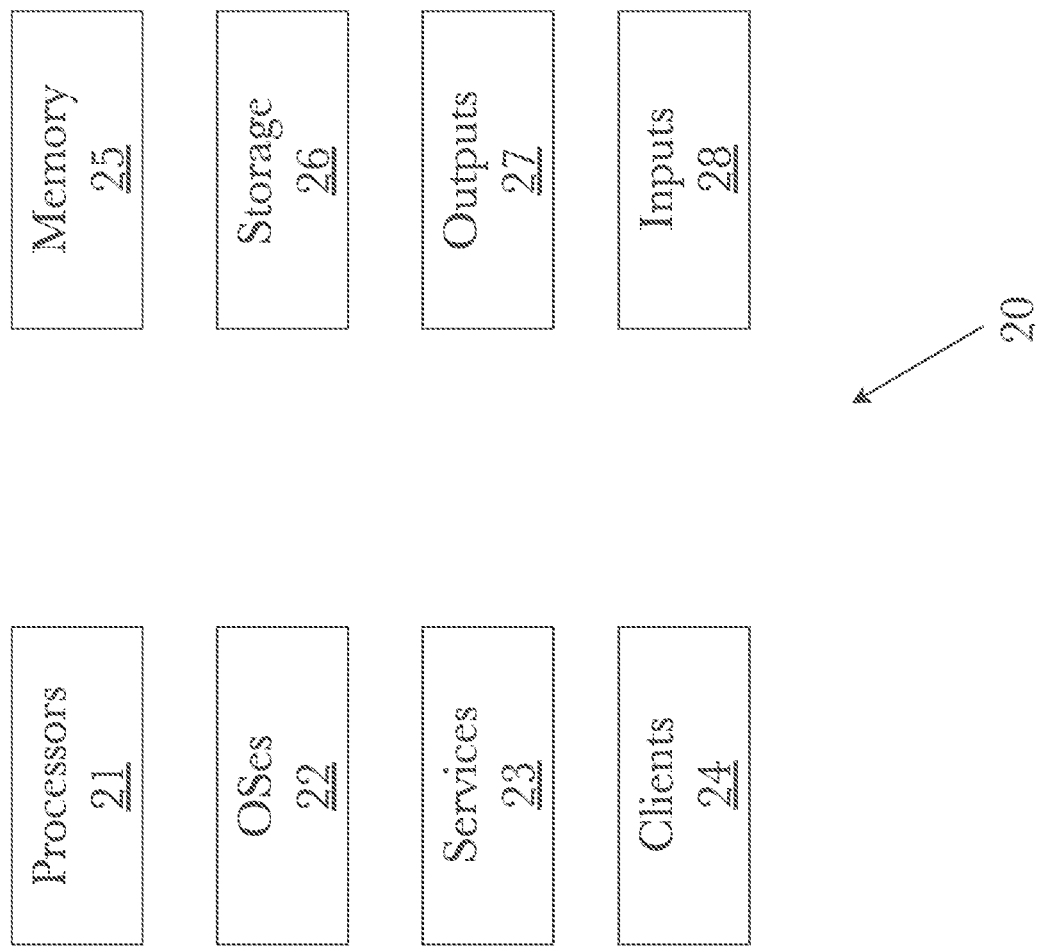
FIG. 13 is a block diagram illustrating an exemplary logical architecture for a client device.

In some aspects, systems may be implemented on a standalone computing system. Referring now to FIG. 13, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 12). Examples of storage devices 26 include flash memory, magnetic hard drive, CD-ROM, and/or the like.

Figure 14:
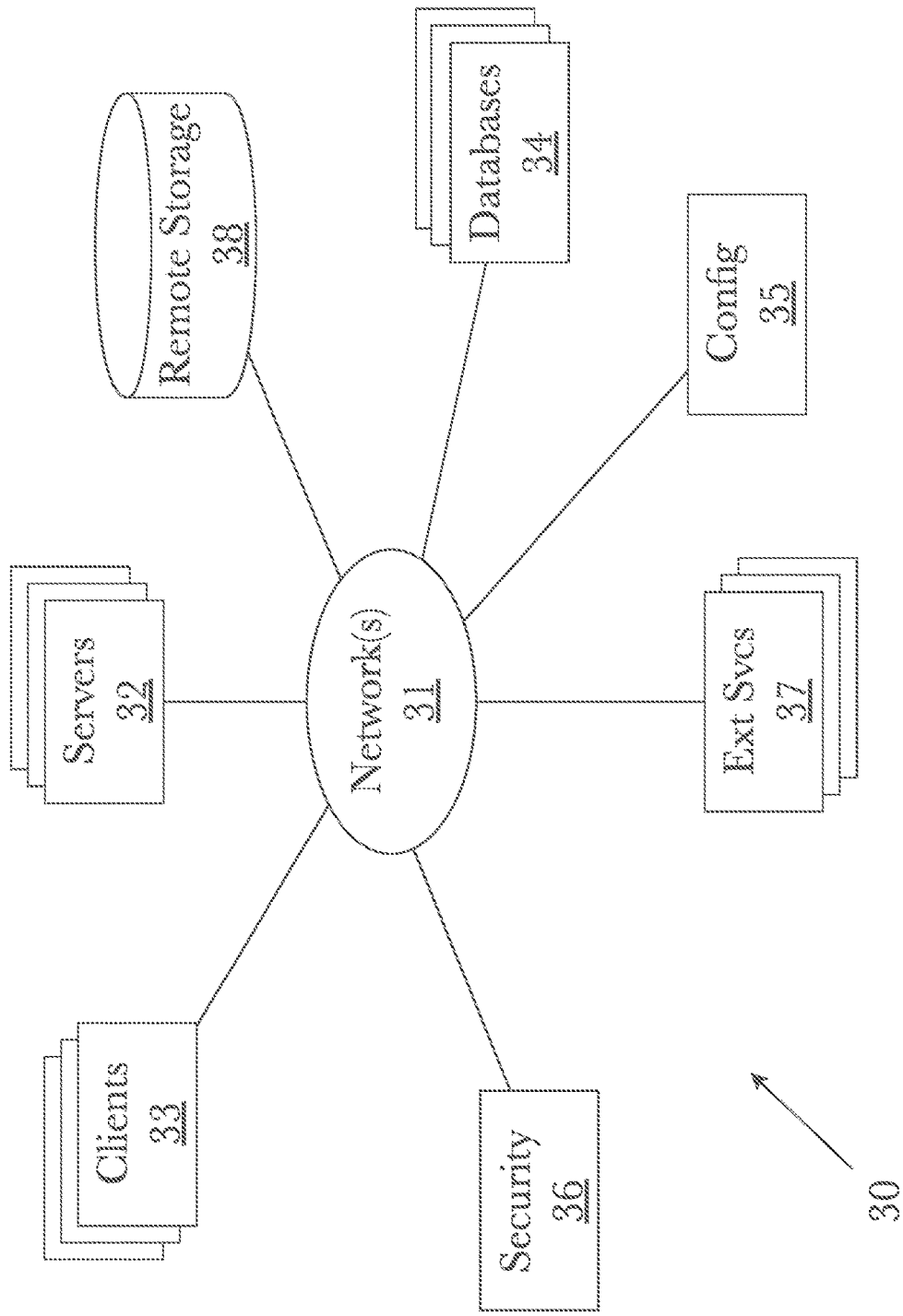
FIG. 14 is a block diagram showing an exemplary architectural arrangement of clients, servers, and external services.

In some aspects, systems may be implemented on a distributed computing network, such as one having any number of clients and/or servers. Referring now to FIG. 14, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 13. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 15:
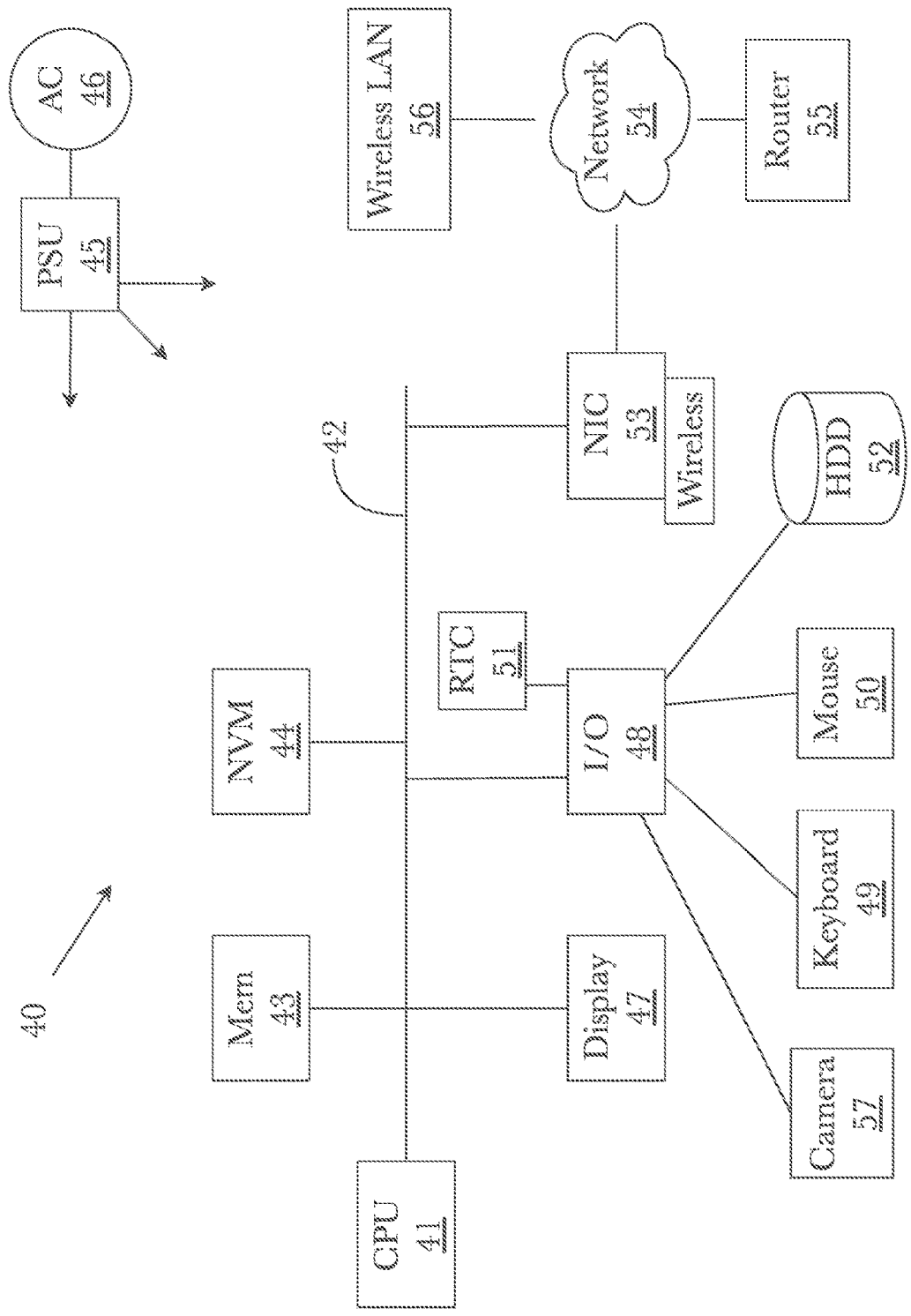
FIG. 15 is another block diagram illustrating an exemplary hardware architecture of a computing device.

FIG. 15 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for link-initiated dynamic-mode verification, comprising:
a dynamic-link verification platform comprising a first plurality of programming instructions stored in a memory of, and operating on a processor of, a first computing device, wherein the first plurality of programming instructions, when operating on the processor, causes the first computing device to:
couple a stored verification event from one or more databases to an initiator ID, wherein the initiator ID is an identification marker unique to the stored verification event, and wherein the verification event comprises a host;
embed the initiator ID into an initiator, wherein the initiator is near-field communication (NFC) beacon that, when interacted with by a mobile computing device, is configured to auto-populate a text message on the mobile computing device;
receive the text message from the mobile computing device, the message comprising the initiator ID and metadata about the mobile device;
retrieve a verification rule associated with the initiator ID, wherein the verification rule comprises verification instructions; and
execute the instructions contained in the verification rule with respect to the text message, wherein the instructions cause the first computing device to:
query one or more databases for information confirming the identity of the owner of the mobile computing device; and
upon confirmation of the identity of the owner of the mobile computing device, send a status notification to the verification event host; and
a verification event host comprising a network-connected electronic device configured to provide a means for access to a controlled physical location upon receipt of the status notification.

2. The system of claim 1, wherein the means for access to the controlled physical location provided by the verification event host is unlocking of a physical lock to a gate or door.

3. The system of claim 1, wherein the means for access to the controlled physical location provided by the verification event host is printing of a physical pass.

4. The system of claim 3, wherein the physical pass is a wristband.

5. The system of claim 3, wherein the physical pass is color coded to indicate an access status.

6. The system of claim 1, wherein the status notification is also sent to the mobile computing device.

7. A method for link-initiated dynamic-mode verification, comprising the steps of:
coupling a stored verification event from one or more databases to an initiator ID, wherein the initiator ID is an identification marker unique to the stored verification event, and wherein the verification event comprises a host;
embedding the initiator ID into an initiator, wherein the initiator is near-field communication (NFC) beacon that, when interacted with by a mobile computing device, is configured to auto-populate a text message on the mobile computing device;
receiving the text message from the mobile computing device, the message comprising the initiator ID and metadata about the mobile device;

retrieving a verification rule associated with the initiator ID, wherein the verification rule comprises verification instructions;

executing the instructions contained in the verification rule with respect to the text message;

querying one or more databases for information confirming the identity of the owner of the mobile computing device; and upon confirmation of the identity of the owner of the mobile computing device, send sending a status notification to the verification event host; and a verification event host comprising a network-connected electronic device configured to provide a means for access to a controlled physical location upon receipt of the status notification.

8. The method of claim 7, wherein the means for access to the controlled physical location provided by the verification event host is unlocking of a physical lock to a gate or door.

9. The method of claim 7, wherein the means for access to the controlled physical location provided by the verification event host is printing of a physical pass.

10. The method of claim 9, wherein the physical pass is a wristband.

11. The method of claim 9, wherein the physical pass is color coded to indicate an access status.

12. The method of claim 7, wherein the status notification is also sent to the mobile computing device.

\* \* \* \* \*